J. SCHANMAN.
COAL CAR WHEEL AND AXLE.
APPLICATION FILED JUNE 30, 1914.
1,170,682.
Patented Feb. 8, 1916.
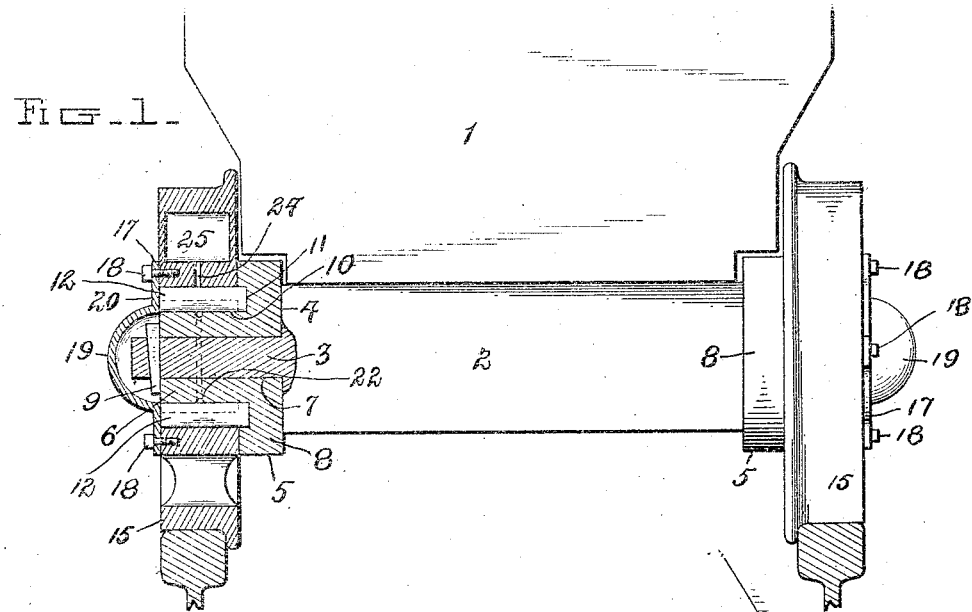
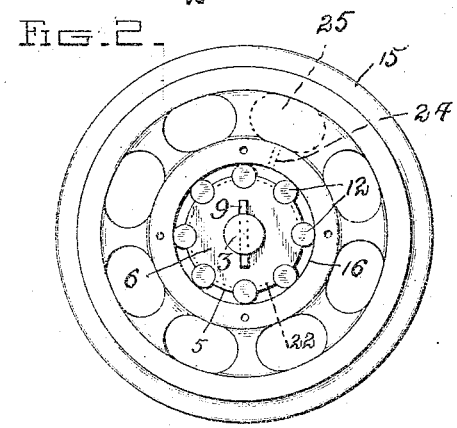
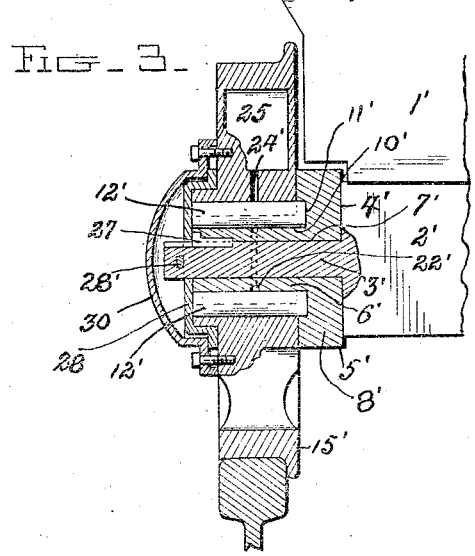
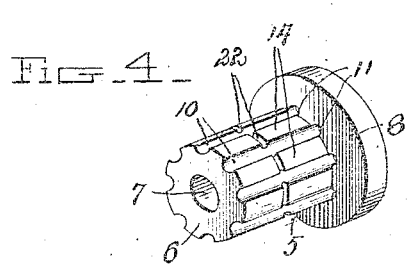
Witnesses
L. B. James
C. A. Rosen
Inventor
Joseph Schanman,
By Havel & Havel
Attorneys

UNITED STATES PATENT OFFICE.

JOSEPH SCHANMAN, OF PITTSBURGH, PENNSYLVANIA.

COAL-CAR WHEEL AND AXLE.

1,170,682.
Specification of Letters Patent.
Patented Feb. 8, 1916.

Application filed June 30, 1914. Serial No. 848,166.

*To all whom it may concern:*

Be it known that I, JOSEPH SCHANMAN, a citizen of the United States, residing at Pittsburgh, in the county of Allegheny and State of Pennsylvania, have invented new and useful Improvements in Coal-Car Wheels and Axles, of which the following is a specification.

The object of the invention is to provide a coal car wheel and axle of novel construction, whereby the constant wearing of the ordinary axle will be obviated.

Another object of the invention is to so construct the device that it may be applied to axles now in use.

Other objects equally important will be hereinafter brought out in connection with the following specification.

Referring to the drawing, Figure 1 is a view in elevation of one end of a coal car showing the rails, one wheel, and one end of the axle in vertical section; Fig. 2 is a view in end elevation of a wheel and end of the axle with the wheel cap removed; Fig. 3 is a view partly in elevation and partly in vertical section of a modified form of the invention; and Fig. 4 is a perspective view of the bearing spacer.

Reference character 1 designates the car body which is mounted on the usual axle 2 having spindle ends 3, a shoulder 4 being provided at the inner end of each spindle 3. In axles now in use, the wheels are journaled directly upon these spindle ends, resulting in a wearing away thereof. With the present invention, a bearing spacer 5 is placed on these spindle ends, either of a new or used axle. This bearing spacer is composed of a cylindrical member 6 having an axial bore 7 to receive the spindle 3, and at the inner end of each spacer is a disk-like collar 8 which engages with the said shoulder 4 at each end of the axle. The bearing spacer 5 is secured in place on the spindle 3 by means of a cotter pin 9, or similar securing means.

In the periphery of the cylindrical portion 6 of the spacer 5 are provided a number of semi-circular grooves 10 which are in spaced parallel relation and all extend longitudinally of the said cylindrical member 6. Coincident with each of these grooves is a cylindrical socket bored into the outer face of the disk-like portion 8. These sockets are designated by numeral 11.

Cylindrical roller bearings 12 are mounted in the grooves 10 and confined therein in spaced relation by the intervening ribs 14. The inner ends of the roller bearings 12 enter the said sockets 11 in the outer face of the disk-like portion 8. The sockets 11 assist the grooves 10 in retaining the roller bearings in place and are of great value in assembling as they firmly hold the inner ends of the rollers against displacement while the wheel is being put in place thereover. The wheel 15 is provided with a larger bore than usual, and in this connection the wheel may be originally formed therewith or a wheel that has been in use, if of suitable formation, may be rebored to suitable size to permit its being placed over the roller bearings. The wall of the wheel bore is indicated by numeral 16. When the wheel is in place, a cap 17 is secured to the outer face of the wheel by screws 18 and it will be noted that the cap 17 consists of a cup-shaped central portion 19 and a surrounding flange 20. The cup-shaped portion 19 incloses the spindle end and its cotter pin 9 and prevents displacement of the latter, while the flange 20 engages with the outer ends of the roller bearings. Hence it will be noted that the thrust of the roller bearings is taken up by the cap flange 20 and the ends of the sockets 11.

For the purpose of lubricating the parts, the spacer 5 is provided with a circumferential groove 22 which intersects each of the ribs 14 so as to carry the lubricant from one roller bearing to the other throughout the series, and for supplying lubricant to this groove 22 a feed port 24 is provided in the wheel hub. The lubricant in large quantity is contained in a chamber 25 in the wheel web, and if desired, this pocket or chamber 25 may be extended entirely around the wheel between its hub and rim.

In the modified form, numeral 1' designates the car body, 2' the axle, 3' the spindle, 4' the axle shoulder, 5' the bearing spacer, 6' the cylindrical portion thereof, 7' the bore for the spindle, and 8' the disk-like end portion of the spacer. The grooves 10' and recesses 11' are as in the preferred form, likewise the oil feeding port 24' and the oil feeding groove 22'. The wheel 15' and the rollers 12' are also the same as in the preferred form. In this instance, the bearing spacer and spindle are provided with key ways which receive a key or pin 27 to prevent rotation of the bearing spacer, and a cap 28 is placed over the end of the spindle and held in place by a cotter pin 28'. This cap 28 holds the roller bearings 12' in place and likewise the wheel from lateral movement. A dust cap 30 corresponding to the cap 17 of the other form incloses the end of the spindle and prevents displacement of the cotter pin 28', which latter is the same as the one 9 of the preferred form.

It will be clear that when the usual car axle has become worn, a bearing spacer as in the present invention may be applied thereto and roller bearings placed therein to afford a new bearing for either a new wheel or a rebored old wheel. Also, it will be noted, that the roller bearings may be readily replaced when worn by merely taking off the caps and slipping out the old and inserting endwise a new roller, without having to jack up the car or to remove the wheel. Owing to the large chamber for holding the lubricant, it will be apparent that the car may be run for a great length of time before it becomes necessary to replenish the supply of lubricant.

What is claimed is:

1. In a device of the character described, a car axle provided with a shoulder, a spindle portion on said axle, a collar on said spindle portion and abutting said shoulder, said collar being provided with grooves, rolling bearings in said grooves and projecting beyond the surface of the collar, a wheel journaled on said rollers, and a cap on said wheel retaining said rolling bearings in their respective grooves.

2. In a device of the character described, a car axle provided with a shoulder, a spindle portion on said axle, a collar on said spindle portion and abutting said shoulder, said collar having a disk-like extension, said collar being provided with bearing receiving grooves and said disk-like extension having recesses coincident with said grooves, cylindrical bearings in said grooves and recesses, said bearings extending beyond the outer face of the collar, a wheel journaled on said bearings, and a cap on said wheel engaging the outer ends of the bearings.

3. In a device of the character described, a car axle provided with a shoulder and a spindle, a tubular cylindrical member on said spindle and abutting said shoulder, a key between the said member and spindle, a disk-like extension on one end of said member, said member having longitudinal semi-circular grooves in its outer surface, said disk-like extension having holes of circular formation in one of its faces, said grooves and recesses being coincident, cylindrical bearings in said grooves and recesses and projecting beyond the outer surface of said member, a wheel journaled on said rollers, a cap on said wheel and engaging the outer ends of the rollers, a pin passed through the spindle and securing the cap in place, and a second cap carried by the wheel and inclosing the end of the spindle and preventing displacement of the said pin, said member having an oil distributing groove and the wheel having an oil chamber and oil distributing port.

In testimony whereof I have hereunto set my hand in presence of two subscribing witnesses.

JOSEPH SCHANMAN.

Witnesses:
J. W. MACDONALD,
THOS. TREGANOWN.